United States Patent
Wang et al.

(10) Patent No.: US 9,736,658 B2
(45) Date of Patent: Aug. 15, 2017

(54) TRANSMITTING EMBMS CONTROL INFORMATION TO WIRELESS DEVICES IN A WIRELESS TELECOMMUNICATIONS NETWORK

(71) Applicant: Telefonaktiebolaget L M Ericsson (publ), Stockholm (SE)

(72) Inventors: Xiaoling Wang, Sollentuna (SE); Ingrid Nordstrand, Sundbyberg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 82 days.

(21) Appl. No.: 14/758,025

(22) PCT Filed: Jan. 18, 2013

(86) PCT No.: PCT/EP2013/050955
§ 371 (c)(1),
(2) Date: Jun. 26, 2015

(87) PCT Pub. No.: WO2014/111157
PCT Pub. Date: Jul. 24, 2014

(65) Prior Publication Data
US 2015/0358785 A1 Dec. 10, 2015

(51) Int. Cl.
*H04L 12/28* (2006.01)
*H04W 4/06* (2009.01)
(Continued)

(52) U.S. Cl.
CPC .............. *H04W 4/06* (2013.01); *H04L 12/189* (2013.01); *H04L 65/4076* (2013.01); *H04W 72/005* (2013.01)

(58) Field of Classification Search
CPC combination set(s) only.
See application file for complete search history.

(56) References Cited

U.S. PATENT DOCUMENTS

2011/0243054 A1* 10/2011 Yi ................. H04W 72/121
370/312
2012/0026929 A1 2/2012 Wang et al.
(Continued)

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," Technical Specification 36.300, Version 11.3.0, 3GPP Organizational Partners, Sep. 2012, 205 pages.

(Continued)

*Primary Examiner* — Frank Duong
(74) *Attorney, Agent, or Firm* — Withrow & Terranova, PLLC (57) ABSTRACT

A method performed by a network node for transmitting enhanced Multimedia Broadcast Multicast Services, eMBMS, control information to wireless devices in a wireless telecommunications network is provided. The eMBMS control information comprises MBMS Single Frequency Network, MBSFN, area configuration information and MCH Scheduling Information, MSI, for a Multicast CHannel, MCH. The MBSFN area configuration information and the MSI indicate Multicast Traffic Channels, MTCHs, for the eMBMS. The network node configures the indication of the MTCHs in the MBSFN area configuration information and in the MSI based on an order of logical channel identities of the MTCHs that is set in the network node. Then, the network node transmits the MBSFN area configuration information and MSI to the wireless devices in the wireless telecommunications network.
A network node and a system are also provided.

13 Claims, 5 Drawing Sheets

(51) Int. Cl.
*H04L 29/06* (2006.01)
*H04W 72/00* (2009.01)
*H04L 12/18* (2006.01)

(56) References Cited

U.S. PATENT DOCUMENTS

2012/0275399 A1\* 11/2012 Liu .................... H04W 28/065
370/329
2013/0294316 A1\* 11/2013 Amerga ............. H04W 72/005
370/312

OTHER PUBLICATIONS

Author Unknown, "Technical Specification Group Radio Access Network; Evolved Universal Terrestrial Radio Access Network (E-UTRAN); M3 Application Protocol (M3AP) (Release 12)," Technical Specification 36.444, Version 12.2.0, 3GPP Organizational Partners, Mar. 2015, 64 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.5.0, 3GPP Organizational Partners, Mar. 2015, 445 pages.
Huawei, "R3-120993: MCE and MBSFN role for distributed MCE architecture," 3rd Generation Partnership Project (3GPP), TSG-RAN3 Meeting #76, Prague, Czech Republic, Feb. 21-25, 2012, 4 pages.
International Search Report and Written Opinion for PCT/EP2013/050955, mailed Nov. 4, 2013, 13 pages.

\* cited by examiner

Fig. 1: Standalone MCE

Fig. 2: Distributed MCE

TRANSMITTING EMBMS CONTROL INFORMATION TO WIRELESS DEVICES IN A WIRELESS TELECOMMUNICATIONS NETWORK

This application is a 35 U.S.C. §371 national phase filing of International Application No. PCT/EP2013/050955, filed Jan. 18, 2013, the disclosure of which is incorporated herein by reference in its entirety.

TECHNICAL FIELD

Embodiments herein relate to the configuration of enhanced Multimedia Broadcast Multicast Services, eMBMS. In particular, embodiments herein relate to transmitting eMBMS control information to wireless devices in a wireless telecommunications network.

BACKGROUND

In a typical cellular network, also referred to as a wireless telecommunication system, a wireless device or User Equipment (UE), communicates via a Radio Access Network (RAN) to one or more Core Networks (CNs).

A wireless device is a device by which a subscriber may access services offered by an operator's network and services outside the operator's network to which the operator's radio access network and core network provide access, e.g. access to the Internet. The wireless device may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The wireless device may be portable, pocket storable, hand held, computer comprised, or vehicle mounted mobile devices, enabled to communicate voice and/or data, via the radio access network, with another entity, such as another wireless device or a server.

Wireless devices are enabled to communicate wirelessly with the communications network. The communication may be performed e.g. between two wireless devices, between a wireless device and a regular telephone and/or between the wireless device and a server via the radio access network and possibly one or more core networks, and possibly the Internet.

The radio access network covers a geographical area which may be divided into cell areas, with each cell area being served by a base station, e.g. a Radio Base Station (RBS), which in some radio access networks is also called eNB, NodeB, B node or base station. A cell is a geographical area where radio coverage is provided by the base station at a base station site. The base stations communicate over the air interface with the wireless devices within range of the base stations. In the following, the term network node or eNB may be used when referring to the base station.

Multimedia Broadcast and Multicast Services (MBMS) is a broadcasting service offered via cellular networks. The MBMS is a point-to-multipoint service in which data is transmitted from a single source entity to multiple recipients. The MBMS service may be used for file download and for streaming type of services, e.g. "Mobile TV".

Enhanced MBMS (eMBMS) is an enhanced version of MBMS and it is used to denominate MBMS service in Evolved Packet Systems (EPS) including E-UTRAN (LTE) and UTRAN access. E-UTRAN is short for Evolved UMTS Terrestrial Radio Access Network, UMTS is short for Universal Mobile Telecommunications System, LTE is short for Long Term Evolution and UTRAN is short for Universal Terrestrial Radio Access Network. eMBMS was included in the Third Generation Partnership Project (3GPP) release 9 specifications. eMBMS is related to broadcasting of content to multiple users equipments simultaneously, utilizing LTE networks. eMBMS may for example be particularly useful during live events, such as music concerts or sports events, where millions of consumers are simultaneously viewing the same content, and where eMBMS may be used to broadcast complementary content, like different camera angles for instance, to LTE wireless devices. eMBMS enables operators to make better use of their available spectrum and free up network capacity. Thus, the operators may maximize efficiency when offering services such as live TV, video on demand, podcasts etc.

One concept in eMBMS is the MBSFN transmission, sometimes also referred to as multi-cell MBMS transmission using MBSFN operation or in a MBSFN area.

MBSFN is an MBMS Single Frequency Network. A MBSFN area comprises multiple cells in which transmission of identical waveforms is performed at the same time. A property of MBSFN transmission is that all participating cells transmit exactly the same content in a synchronized manner so it appears as one transmission to the wireless device. This gives the possibility for wireless devices to combine MBMS transmissions from multiple cells. Transmitting the same data to multiple wireless devices allows network resources to be shared. Mechanisms are therefore provided to ensure synchronization of the MBMS content—i.e. to ensure that all participating eNBs include the same MBMS control information and data in the corresponding time-synchronized subframe.

On the interface between the eNBs and the wireless devices, eMBMS introduces the logical channels MCCH and MTCH.

MCCH is short for Multicast Control CHannel and is a point-to-multipoint downlink channel used for transmitting MBMS control information from the eNB to the wireless devices. There is one MCCH for each MBSFN area.

MTCH is short for Multicast Traffic CHannel and is used for point-to-multipoint downlink transmission of MBMS user plane information from the eNB to the wireless devices. One MTCH is established in eMBMS for each eMBMS transmission/session.

A transport channel, MCH, is used to transport the MCCH and the MTCH(s), and a physical channel, PMCH, is used for transmitting the MCH. MCH is short for Multicast CHannel, and PMCH is short for Physical Multicast CHannel. There is a one-to-one mapping between the MCH and the PMCH.

The eMBMS is realized in the 3GPP specifications by the addition of a number of new capabilities to existing functional entities of the 3GPP architecture and by addition of a new functional entity, a Multi-cell/multicast Coordination Entity (MCE). According to 3GPP, there are two eMBMS deployment alternatives:

Alternative 1: Standalone MCE, see FIG. 1.
Alternative 2: Distributed MCE, see FIG. 2.
Alternative 1

Figure 1:
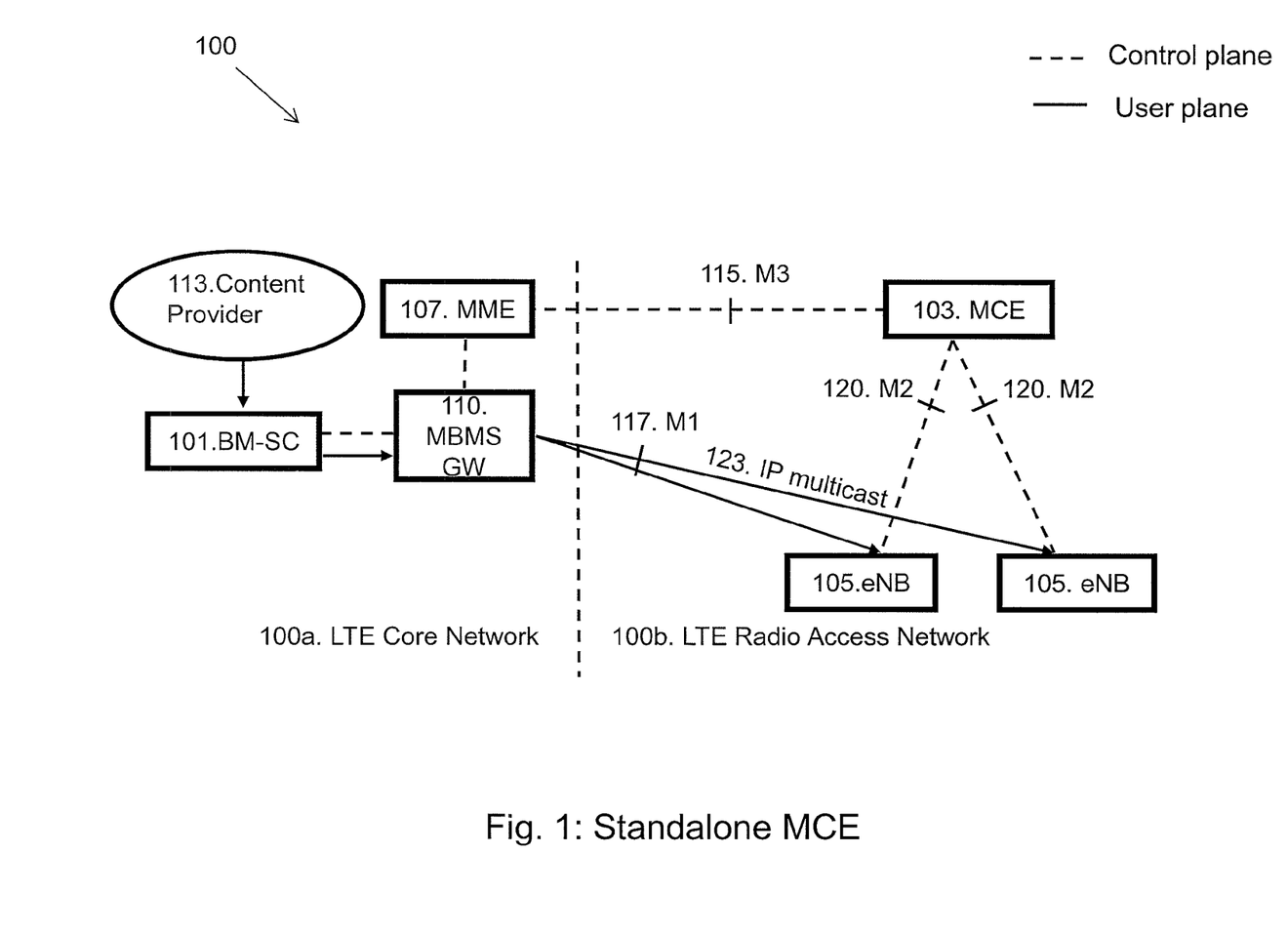
FIG. 1 is a schematic block diagram illustrating a wireless telecommunications network with a standalone MCE functionality.

Alternative 1 with the standalone MCE will now be described with reference to FIG. 1. FIG. 1 is an illustration of the eMBMS logical architecture of a wireless telecommunications network 100 with a standalone MCE.

The wireless telecommunications network 100 comprises a LTE core network 100a and a LTE radio access network 100b. The Broadcast Multicast Service Center (BM-SC) 101 is an entity which controls MBMS sessions and corresponding MBMS bearers.

In FIG. 1, the MCE 103 is a logical standalone entity. The functions of the MCE 103 are the admission control and the allocation of radio resources used by all eNBs 105 in the MBSFN area. Only two eNBs 105 are shown in FIG. 1 for the sake of simplicity, but the skilled person will understand that more than two eNBs 105 may also be comprised in the wireless telecommunications network 100.

The Mobility Management Entity (MME) 107 is a control node in the wireless telecommunications network 100. MBMS GateWay (MBMS GW) 110, is an entity that is present between the BM-SC 101 and eNBs 105 whose functions is the sending/broadcasting of MBMS packets to each eNB 105 transmitting the service. The MBMS GW 110 performs MBMS Session Control Signaling towards the E-UTRAN via the MME 107.

The content provider 113 provides eMBMS services to the wireless telecommunications network 100. The M3 115 is the interface between the MCE 103 and the MME 107, and is a control plane interface as indicated by the dotted line. M1 117 is the interface between the MBMS GW 110 and the eNBs 105, and is a user plane interface as indicated by the continuous line. M2 120 is a control plane interface between the MCE 103 and the eNBs 105. IP multicast 123 is used for point-to-multipoint delivery of user packets from the MBMS GW 110 to the eNBs 105.

It should be noted that according to this alternative, since the stand-alone MCE 103 controls the allocation of radio resources used by all eNBs 105 in the MBSFN area for the MBSFN transmission, the transmission of the allocation of radio resources to the wireless devices in the same MBSFN area is performed in the same manner by all eNBs 105.

Alternative 2

Figure 2:
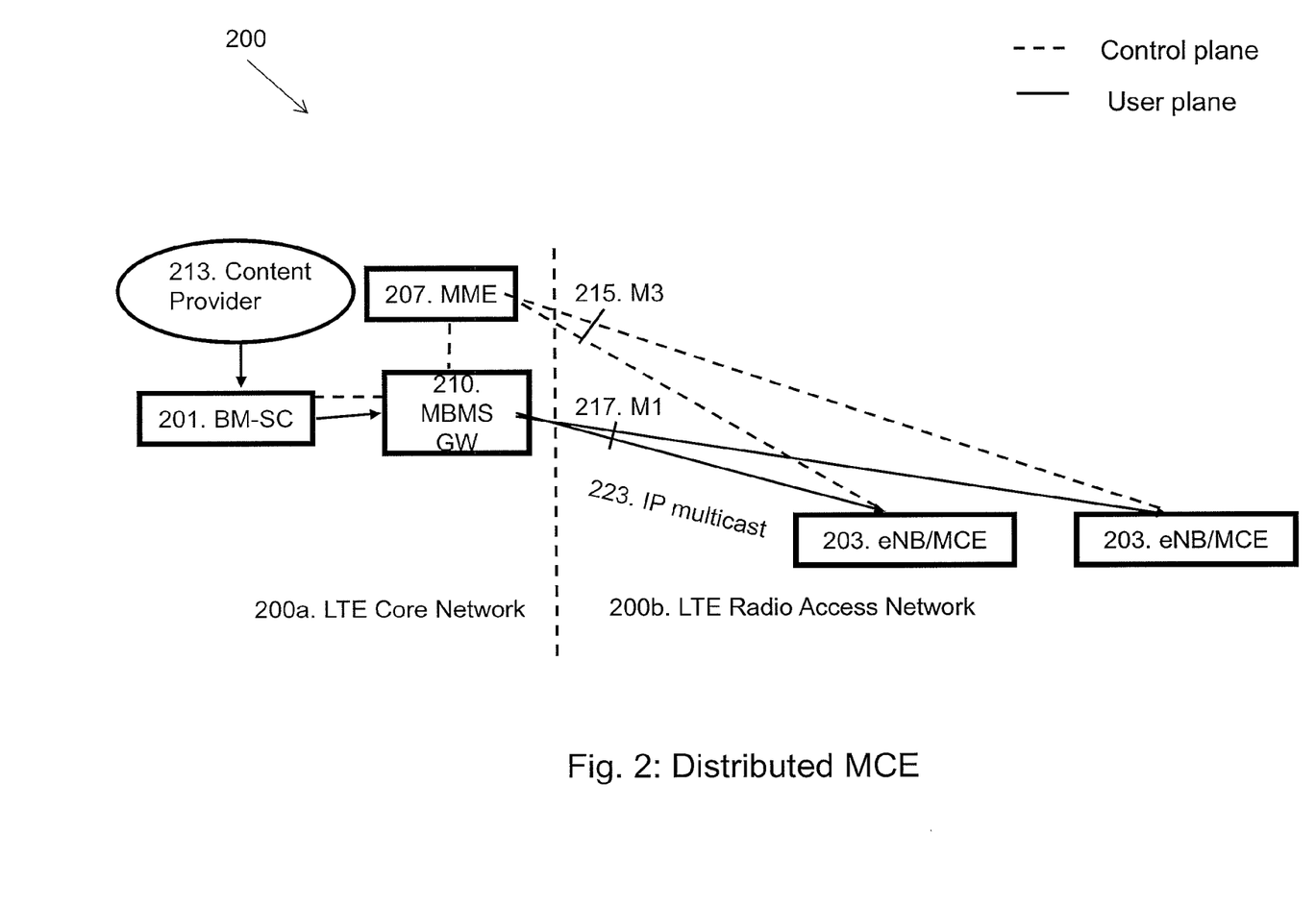
FIG. 2 is a schematic block diagram illustrating a wireless telecommunications network with a distributed MCE functionality.

Alternative 2 with the distributed MCE will now be described with reference to FIG. 2. FIG. 2 is an illustration of the eMBMS logical architecture of a wireless telecommunications network 200 with a distributed MCE.

The wireless telecommunications network 200 comprises a LTE core network 200a and a LTE radio access network 200b. The Broadcast Multicast Service Center (BM-SC) 201 is an entity which controls MBMS sessions and corresponding MBMS bearers.

In this FIG. 2, the MCE is a distributed entity which is a part of another network element, i.e. the eNB. In FIG. 2, the combined MCE and eNB is referred to as an eNB/MCE 203.

Here, the Mobility Management Entity (MME) 207 is a control node in the communications network 200. The MBMS GW 210 is an entity that is present between the BM-SC 201 and eNB/MCE 203 whose functions is the sending/broadcasting of MBMS packets to each eNB/MCE 203 transmitting the service. The MBMS GW 210 performs MBMS Session Control Signaling towards the E-UTRAN via the MME 207.

The content provider 213 provides eMBMS services to the communications network 200. The M3 215 is the interface between the MCE part of the eNB/MCE 203 and the MME 207, and is a control plane interface as indicated by the dotted line. Thus, the architecture in FIG. 2 may be referred to as being a M3 based architecture. M1 217 is the interface between the MBMS GW 210 and the eNB part of the eNB/MCE 203 and is a user plane interface as indicated by the continuous line. IP multicast 223 is used for point-to-multipoint delivery of user packets.

In this alternative, the allocation of radio resources used by the distributed eNB/MCEs 203, i.e. multiple distributed MCEs where the multiple MCEs are co-allocated in eNBs, may be configured by another configuration node, such as, e.g. by an Operation Support Systems (OSS) node. It is then up to each of the eNB/MCEs 203 in the same MBSFN area to transmit the allocation of radio resources to wireless devices.

Unfortunately, it has been noticed that for the distributed eNBs/MCEs 203 receiving non-coherent allocations of radio resources from each of the eNB/MCEs 203 in the MBSFN area may result in failure in the reception of the MBSFN transmission at the wireless devices.

SUMMARY

It is an object of embodiments herein to improve eMBMS transmissions to wireless devices in a wireless communications network having a distributed MCE functionality.

According to a first aspect of embodiments herein, the object is achieved by a method performed by a network node for transmitting enhanced Multimedia Broadcast Multicast Services, eMBMS, control information to wireless devices in a wireless telecommunications network. The eMBMS control information comprises MBMS Single Frequency Network, MBSFN, area configuration information and MCH Scheduling Information, MSI, for a Multicast CHannel, MCH. The MBSFN area configuration information and the MSI indicate Multicast Traffic Channels, MTCHs, for the eMBMS. The network node configures the indication of the MTCHs in the MBSFN area configuration information and in the MSI based on an order of logical channel identities of the MTCHs that is set in the network node. Then, the network node transmits the configured MBSFN area configuration information and MSI to the wireless devices in the wireless telecommunications network.

According to a second aspect of embodiments herein, the object is achieved by a network node for transmitting eMBMS control information to wireless devices in a wireless telecommunications network. The eMBMS control information comprises MBSFN area configuration information and MSI for a MCH. The MBSFN area configuration information and the MSI indicate Multicast Traffic Channels, MTCHs, for the eMBMS. The network node comprises processing circuitry configured to configure the indication of the MTCHs in the MBSFN area configuration information and in the MSI based on an order of logical channel identities of the MTCHs that is set in the network node. The processing circuitry is further configured to transmit the configured MBSFN area configuration information and MSI to the wireless devices in the wireless telecommunications network.

According to a third aspect of embodiments herein, the object is achieved by a system in a wireless telecommunications network. The system comprises a first and a second network node for transmitting eMBMS control information to wireless devices in the wireless telecommunications network. The eMBMS control information comprises MBSFN area configuration information and MSI for a MCH. The MBSFN area configuration information and the MSI indicate Multicast Traffic Channels, MTCHs, for the eMBMS. The first and the second network node are configured to configure the indication of the MTCHs in the MBSFN area configuration information and in the MSI based on an order of logical channel identities of the MTCHs that is set in each of the first and second network node, respectively, wherein the order of logical channel identities of the MTCHs set in the first and second network node is the same.

By having a set order of the logical channel identities of the MTCHs in the network nodes, which is adhered to when configuring the indications of the MTCHs in the MBSFN area configuration information and in the MSI, it is ensured that wireless devices combining eMBMS transmissions from these network nodes will receive exactly the same content in exactly the same order, since all MTCHs will be in the same order irrespective from which of the network nodes the eMBMS transmissions are sent.

In other words, by forcing the network nodes to order the MTCHs based on the logical channel identities of the MTCHs in a unified manner and indicate this correspondingly in the MBSFN area configuration information and MSI, any problems resulting from differing or arbitrary, i.e. non-coherent, orders of MTCHs in eMBMS transmissions are avoided.

Hence, eMBMS transmissions to wireless devices in a wireless communications network having a distributed MCE functionality are improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 3:
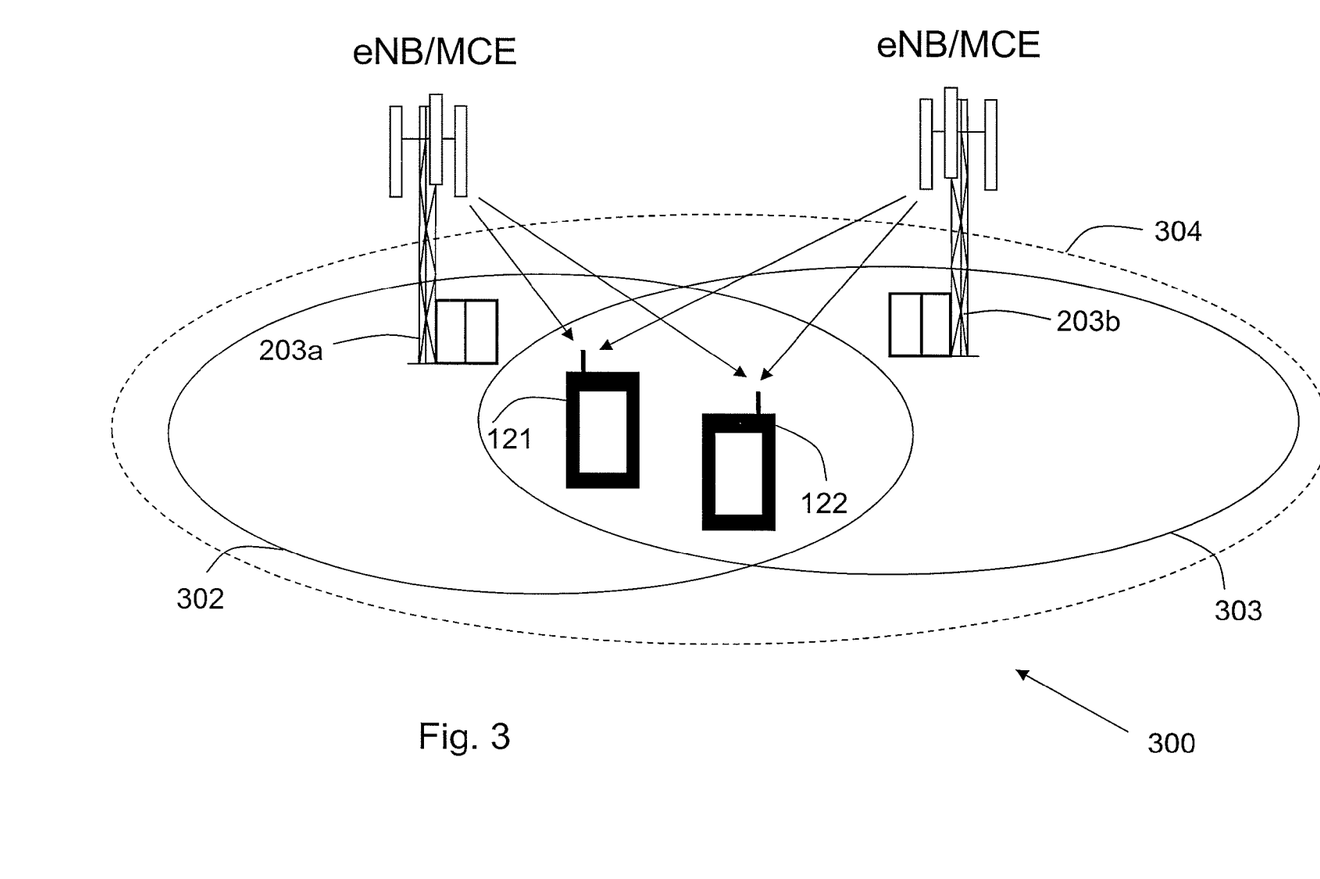
FIG. 3 is a schematic illustration of network nodes and wireless devices in a wireless telecommunications network.

FIG. 3 depicts a wireless telecommunications network 300 in which embodiments herein may be implemented. The wireless telecommunications network 300 applies to a Radio Access Technology (RAT) such as e.g. LTE.

The wireless telecommunications network 300 comprises a first network node 203a serving a first cell 302. The first network node 203a is an entity capable to communicate over a radio carrier with wireless devices 121, 122 being present in the first cell 302. The first network node 203a may in this example e.g. be an eNB, eNodeB, or a Home Node B, a Home eNode B, femto Base Station (BS), pico BS or any other network unit capable to serve a wireless device or a machine type communication device in a wireless telecommunications system. The first network node 203a may also be referred to as a radio network node or a base station.

The wireless devices 121, 122 may support MBMS and/or eMBMS. The first network node 203a comprises an MCE, i.e. MCE functionality. The MCE functionality herein is described above with reference to FIG. 2.

The wireless telecommunications network 300 further comprises a second network node 203b serving a second cell 303. The second network node 203b is an entity capable to communicate over a radio carrier with wireless devices 121, 122 being present in the second cell 303. The second network node 203b also comprises an MCE or MCE functionality as previously described above.

Hence, the first and second network node 203a, 203b comprise a distributed MCE functionality in the wireless telecommunications network 300 as described above with reference to FIG. 2, Hereinafter, the first and second network node 203a, 203b may also be referred to as eNB/MCE 203a and eNB/MCE 203b, respectively.

The first cell 302 and the second cell 303 are comprised in a MBSFN area 304.

When a wireless device 121, 122 is moving e.g. from the first cell 302 to the second cell 303, the wireless device 121, 122 will at some point be in an overlapping area between the first cell 302 and the second cell 303. In this overlapping area, the wireless devices 121, 122 may be communicating with both the first network node 203a and the second network node 203b.

The wireless device 121, 122 may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC.

Unfortunately, when having a conventional distributed MCE functionality, each eNB/MCE is unaware of how the allocation of radio resources is transmitted to the wireless devices by another eNB/MCE for a MBSFN transmission in the same MBSFN area. It has been noted that differing or arbitrary, i.e. non-coherent, transmissions of the allocation of radio resources by two different eNB/MCEs to the wireless devices may result in failure in the reception of the MBSFN transmission at the wireless devices.

No support to handle such cases is described in current 3GPP standard, such as, e.g. E-UTRAN Overall Description, 3GPP TS 36.300; E-UTRA RRC protocol specification, 3GPP TS 36.331; or E-UTRAN M3 Application Protocol, 3GPP TS 36.444.

Therefore, as part of the developing of the embodiments described herein, a problem will first be identified and discussed in more detail.

When having ongoing eMBMS transmissions/sessions, eNBs broadcasts Radio Resource Control (RRC) messages to the wireless devices located in the cells comprised in the MBSFN area. The RRC messages are carried on the MCCH, and are sent based on a MCCH repetition period.

The RRC messages comprise MBMS Single Frequency Network, MBSFN, area configuration information, and may also referred to as MBSFNAreaConfiguration messages. The MBSFN area configuration information comprises an eMBMS session list of the ongoing the eMBMS transmission/sessions and their radio resource configurations to the wireless devices. The eMBMS session list may also be referred to as a MCCH session list.

In this eMBMS session list, the MTCH for each of the eMBMS transmission/sessions is indicated. However, the order in which the MTCHs in the eMBMS session list are indicated may be arbitrarily determined by the MCE functionality in the wireless telecommunications network.

Also, when having ongoing eMBMS transmissions/sessions, the eNBs further broadcasts MCH Scheduling Information, MSI, to the wireless devices located in the cells comprised in the MBSFN area. The MSI is comprised in a Media Access Control, MAC, control element, in a MAC Protocol Data Unit, PDU, and is sent at each beginning of a MCH Scheduling Period, MSP, on the MCH.

On the MCH, a MCH Subframe Allocation, MSA, indicates the subframes of the current MSP. The MSI is sent in the $1^{st}$ subframe of each MSA to indicate the subframe position of each MTCH and unused subframes of the MSA on the MCH, i.e. the order of which the MTCHs are scheduled in the MSA on the MCH.

Thus, for the current MSP, the MSI indicates which subframe in the MSA that is used by which MTCH, i.e. how each MTCH is mapped to the MSA subframes.

According to the standard 3GPP TS 36.300 for MSI, the "sessions are scheduled in the order in which they are included in the MCCH session list". This means that the eNBs simply follows the order in which the MTCHs are comprised in the eMBMS session list in the MBSFN area configuration information, when scheduling the MTCHs on the subframes in the MSA on the MCH for the current MSP and when indicating this scheduling of the MTCHs in the MSI.

Consequently, the MSI will indicated the same order of the MTCHs on the subframes in the MSA on the MCH for the current MSP, that has been signaled on the higher layer, i.e. the MBSFN area configuration information in the MCCH, by the MCE functionality in the wireless telecommunications network.

This means that both the eMBMS session list in the MBSFN area configuration information and the MSI will have the same arbitrary order of the MTCHs as determined by the MCE functionality in the wireless telecommunications network.

While this configuration do not cause any problems when having a single, standalone MCE functionality (e.g. see FIG. 1) in the wireless telecommunications network, this may cause problems in when having a distributed MCE functionality, i.e. separate MCE functionalities in each eNB for the same MBSFN area (e.g. see FIG. 2).

For example, when two eNB/MCEs are to transmit a multi-cell MBMS transmission to wireless devices in the MBSFN area, the order of the MTCHs in the MBSFN area configuration information and in the MSI from one of the eNB/MCEs may differ from the order of the MTCHs in the MBSFN area configuration information and in the MSI from the other one of the eNB/MCEs. This is because the order of the MTCHs is locally arbitrary, i.e. specific for each eNB/MCE in the MBSFN, and not globally arbitrary, i.e. specific for all eNB/MCEs in the MBSFN. The latter being the case when having a single, standalone MCE functionality for all eNBs.

In this case, when wireless devices are to combine the multi-cell MBMS transmissions from multiple eNBs/MCEs, it will not see exactly the same content due to the differing order of the MTCHs received from different eNB/MCEs.

This problem is addressed by the embodiments described in the following by forcing the eNB/MCEs 203a, 203b to order the MTCHs based on the logical channel identities of the MTCHs in a unified manner and indicate this accordingly in the MBSFN area configuration information and MSI. Thus, any problems in the eMBMS transmissions resulting from differing or arbitrary orders of MTCHs in the MBSFN area configuration information and MSI from the different eNB/MCEs 203a, 203b are avoided. Thus, eMBMS transmissions to wireless devices in a wireless communications network having a distributed MCE functionality are improved.

Figure 4:
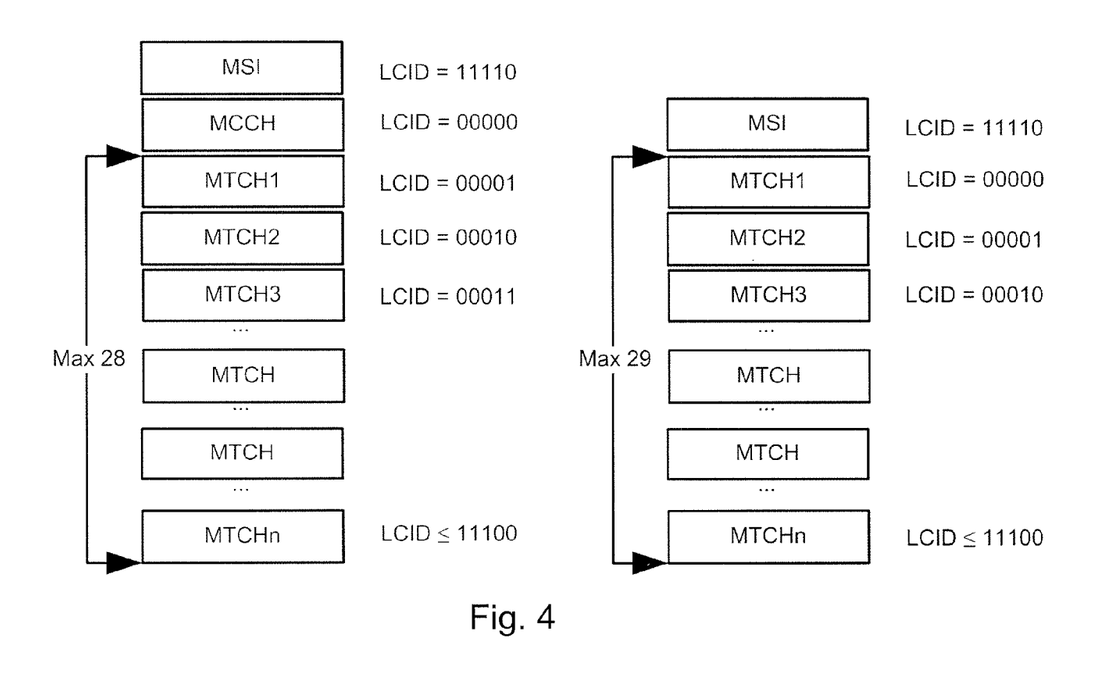
FIG. 4 is a schematic illustration depicting two examples of a MAC payload, one with MSI only and one with MSI and MCCH.

FIG. 4 shows two examples of a MAC payload with MSI, one with the MCCH (left) and one without the MCCH (right).

The MAC payload with MSI and MCCH (left) is transmitted at a beginning of an MSP on the MCH when indicated by the MCCH repetition period. The MAC payload with MSI only (right) is transmitted at each beginning of an MSP on the MCH unless a MAC payload with MSI and MCCH is transmitted.

It should be noted that the MSP configured for the MCH carrying MCCH must be smaller or equal to the MCCH repetition period. For example, a MSP typically comprise a value range of {8, 16, 32, 128, 256} radio frames, while a MCCH repetition period normally comprises a value range of {32, 64, 128, 256} radio frames. However, it should be noted that these value ranges may be extended for further radio frames whenever applicable.

As shown in FIG. 4, up to 29 MTCHs may be mapped to one and the same MCH, or up to 28 in case of the MAC payload also comprising a MCCH. It may also be seen that each MTCH comprises a logical channel identity (LCID). For example, MTCH1 has LCID=00001, MTCH2 has LCID=00010, MTCH3 has LCID=00011, etc.

In the MAC payload and after the MSI and MCCH (if present), the MAC payload comprises an MTCH for each eMBMS transmission/session. The MTCHs being scheduled in the order in which they are comprised in the eMBMS session list in the MBSFN area configuration information.

Figure 5:
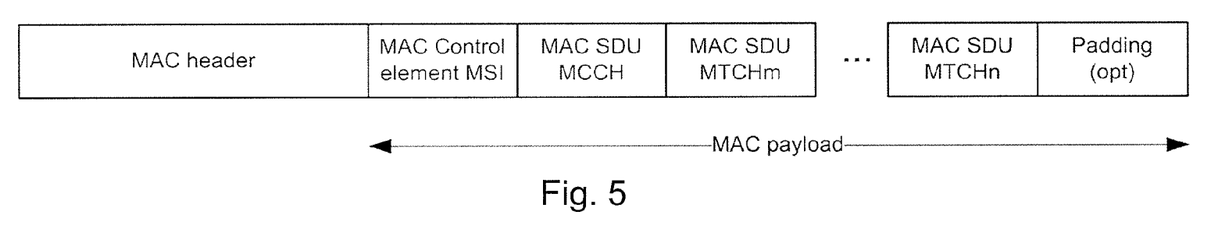
FIG. 5 is a schematic illustration depicting a MAC PDU comprising a MAC payload with MSI and MCCH.

FIG. 5 shows an example of a MAC PDU with a MAC payload comprising MSI and MCCH. A similar MAC PDU for a MAC payload without the MCCH may also be used when this is the case. The MAC PDU may be transmitted by the network node 203a, 203b to the wireless device 121, 122 upon having ongoing eMBMS transmissions/sessions according to the MCCH repetition period and MSP described above.

The MSI is comprised in the MAC Control Element. The MCCH is comprised in a MAC Service Data Unit, SDU. Here, the MAC SDU with the MCCH comprises the MBSFN area configuration information. The MTCHs are here comprised in subsequent MAC SDUs. In case of unused subframes, padding may be used.

Example of embodiments of a method performed by a network node 203a, 203b for transmitting enhanced Multimedia Broadcast Multicast Services, eMBMS, control information to wireless devices 121,122 in a wireless telecommunications network 300, will now be described with reference to a flowchart depicted in FIG. 6.

Figure 6:
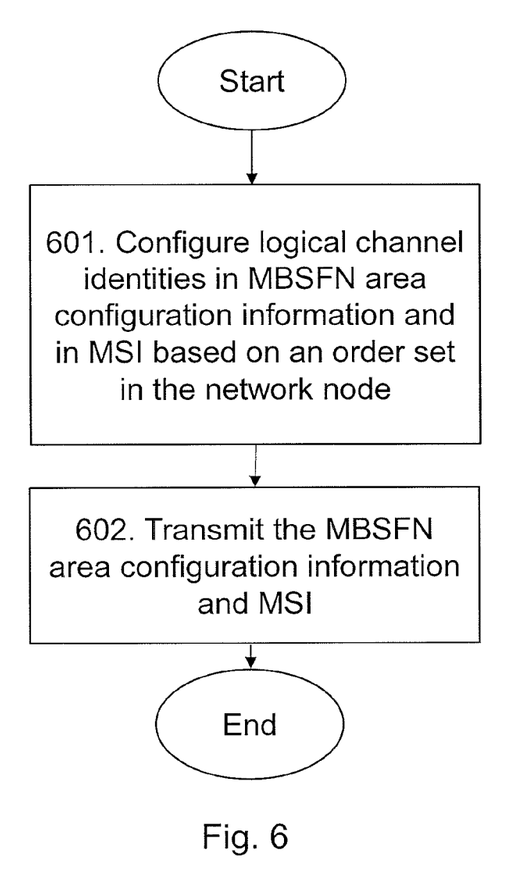
FIG. 6 is a flowchart depicting embodiments of a method in a network node.

FIG. 6 is an illustrated example of exemplary actions or operations which may be taken by the network node 203a, 203b. The eMBMS control information comprises MBMS Single Frequency Network, MBSFN, area configuration information and MCH Scheduling Information, MSI, for a Multicast CHannel, MCH. The MBSFN area configuration information and the MSI indicate Multicast Traffic Channels, MTCHs, for the eMBMS. The method may comprise the following actions.

Action 601. In this action, the network nodes 203a, 203b configure the indication of the MTCHs in the MBSFN area configuration information and in the MSI based on an order of logical channel identities of the MTCHs that is set in the network nodes 203a, 203b. It should be noted that the term "set" means that the order of the logical channel identities of the MTCHs are configured or pre-defined in the network node 203a, 203b.

By configuring the indications of the MTCHs in the MBSFN area configuration information and in the MSI in this manner, it is ensured that the wireless devices 121, 122 combining eMBMS transmissions from network nodes 203a, 203b will receive exactly the same content in exactly the same order, i.e. coherently, since all MTCHs will be in the same order irrespective from which of the network nodes the eMBMS transmissions are sent.

The order of the logical channel identities of the MTCHs that is set in the network node 203a, 203b may indicate that e.g. an increasing order of logical channel identities, LCIDs, or a decreasing order of logical channel identities should be used for the MTCHs. However, any other suitable other suitable order of the logical channel identities of the MTCHs may also be set in the network node 203a, 203b.

In some embodiments, the network node 203a, 203b may configure the indication of the MTCHs in the MBSFN area configuration information and the indication of the MTCHs in the MSI according to the order of the logical channel identities, LCIDs, of the MTCHs that is set in the network node 203a, 203b. In this case, the order of the logical identities of the MTCHs may be explicitly identified in the network node 203a, 203b. For example, LCID=00001 on the $2^{nd}$ subframe, and LCID=00010 on the $5^{th}$ subframe, and so on.

In some embodiments, the network node 203a, 203b may configure the indication of the MTCHs in the MBSFN area configuration information according to the order of the logical channel identities of the MTCHs that is set in the network node 203a, 203b. In this case, the indication of the MTCHs in the MSI may be configured by the network node 203a, 203b according to the order of the MTCHs in the MBSFN area configuration information. The indication of the MTCHs in the MSI may in this case thus be configured in accordance with the standard 3GPP TS 36.300 for MSI.

By configuring the indication of the MTCHs in the MBSFN area configuration information based on an order of logical channel identities of the MTCHs that is set in the network node 203a, 203b, it should also be understood that the network node 203a, 203b inherently will schedule the MTCHs based on the same order since the scheduling order is set based on the MBSFN area configuration information.

Action 602. In this action, the network node 203a, 203b transmits the MBSFN area configuration information and MSI to the wireless devices 121,122 in the wireless telecommunications network 300.

In some embodiments, the network node 203a, 203b may transmit the MBSFN area configuration information on a MCCH in a MAC PDU based on a MCCH repetition period to the wireless devices 121, 122. The network node 203a, 203b may also transmit the MSI in a MAC PDU at the beginning of each MSP to the wireless devices 121, 122. Further, when transmitting the MBSFN area configuration information on a MCCH, the MCCH may be comprised in the same MAC PDU as the MSI and be sent at the beginning of a MSP.

Figure 7:
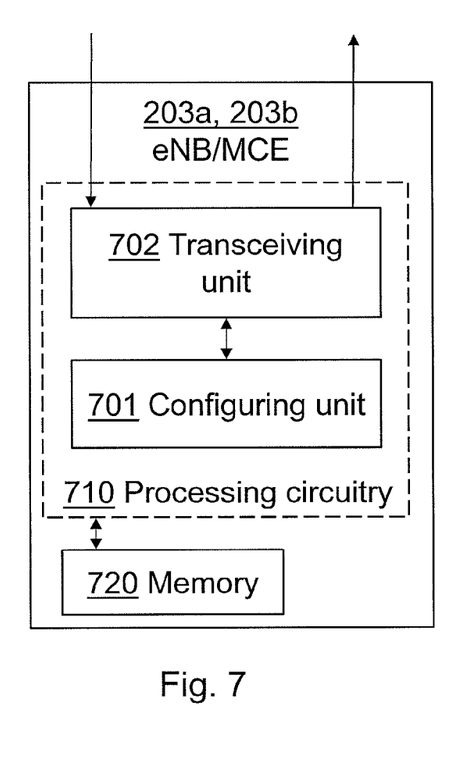
FIG. 7 is a block diagram depicting embodiments of a network node.

To perform the method actions in the network node 203a, 203b for transmitting eMBMS control information to wireless devices 121, 122 in a wireless telecommunications network 300, the network node 203a, 203b may comprise the following arrangement depicted in FIG. 7.

FIG. 7 shows a schematic block diagram of embodiments of the network node 203a, 203b. The eMBMS control information comprises MBMS Single Frequency Network, MBSFN, area configuration information and MCH Scheduling Information, MSI, for a Multicast CHannel, MCH. The MBSFN area configuration information and the MSI indicate Multicast Traffic Channels, MTCHs, for the eMBMS.

The network node 203a, 203b comprises a configuring unit 701, which may also be referred to as a configuration device or circuitry. The configuring unit 701 is configured to configure the indication of the MTCHs in the MBSFN area configuration information and in the MSI based on an order of logical channel identities of the MTCHs that is set in the network node 203a, 203b.

The order of the logical channel identities of the MTCHs that is set in the network node 203a, 203b may indicate that e.g. an increasing order of logical channel identities, LCIDs, or a decreasing order of logical channel identities should be used for the MTCHs. However, any other suitable other suitable order of the logical channel identities of the MTCHs may also be set in the network node 203a, 203b.

In some embodiments, the processing circuitry 710 may be configured to configure the indication of the MTCHs in the MBSFN area configuration information and the indication of the MTCHs in the MSI according to the order of the logical channel identities of the MTCHs that is set in the network node 203a, 203b.

In some embodiments, the processing circuitry 710 may be configured to configure the indication of the MTCHs in the MBSFN area configuration information according to the order of the logical channel identities of the MTCHs that is set in the network node 203a, 203b. In this case, the processing circuitry 710 may also be configured to configure the indication of the MTCHs in the MSI according to the indication of the MTCHs in the MBSFN area configuration information. The indication of the MTCHs in the MSI may in this case thus be configured by the processing circuitry 710 in accordance with the standard 3GPP TS 36.300 for MSI.

The network node 203a, 203b also comprises a transceiving unit 702, which may also be referred to as a transceiver or a transceiving device or circuitry. The transceiving unit 702 is configured to transmit the MBSFN area configuration information and MSI to the wireless devices 121,122 in the wireless telecommunications network 300.

In some embodiments, the transceiving unit 702 is configured to transmit the MBSFN area configuration information on a MCCH in a MAC PDU based on a MCCH repetition period to the wireless devices 121, 122. The network node 203a, 203b may also transmit the MSI in a MAC PDU at the beginning of each MSP to the wireless devices 121, 122. Further, when transmitting the MBSFN area configuration information on a MCCH, the MCCH may be comprised in the same MAC PDU as the MSI and be sent at the beginning of a MSP.

The network node 110 may comprise a processing circuitry 710, which may also be referred to as a processor or a processing unit. The processing circuitry 710 may comprise the configuration unit 701 and the transceiving unit 702.

The embodiments for transmitting eMBMS control information to wireless devices 121, 122 in a wireless telecommunications network 300 may be implemented through one or more processors, such as the processing circuitry 710 in the network node 203a, 203b depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the network node 203*a*, 203*b*. The computer program code may e.g. be provided as pure program code in the network node 203*a*, 203*b* or on a server and downloaded to the network node 203*a*, 203*b*.

The network node 203*a*, 203*b* may further comprise a memory 720 comprising one or more memory units. The memory 720 may be arranged to be used to store data, such as, e.g. a set order of logical channel identities of the MTCHs or an indication of the same, to perform the methods herein when being executed in the network node 203*a*, 203*b*.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 710 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

According to a further aspect of the embodiments herein, a system in the wireless telecommunications network 300 is also described. The system comprises at least a first network node 203*a* and a second network node 203*b* for transmitting eMBMS control information to wireless devices 121,122 in the wireless telecommunications network 300.

The eMBMS control information comprises MBMS Single Frequency Network, MBSFN, area configuration information and MCH Scheduling Information, MSI, for a Multicast CHannel, MCH. The MBSFN area configuration information and the MSI indicate Multicast Traffic Channels, MTCHs, for the eMBMS.

The at least first and second network node 203*a*, 203*b* each comprises processing circuitry 710 configured to configure the indication of the MTCHs in the MBSFN area configuration information and in the MSI based on an order of logical channel identities of the MTCHs that is set in each of the first and second network node 203*a*, 203*b*, respectively. Here, the order of logical channel identities of the MTCHs set in the first and second network node 203*a*, 203*b* is the same.

In such a system as described above, it is ensured that the MBSFN area configuration information and MSI will indicate the same unified order of the MTCHs to wireless devices 121, 122 receiving eMBMS transmissions from the first and second network node 203*a*, 203*b*. Also, consequently, all MTCHs will also be received on the MCH by the wireless devices 121, 122 in accordance with the indicated unified order.

The terminology used in the detailed description of the particular exemplary embodiments illustrated in the accompanying drawings is not intended to be limiting of the described method, network node 203*a*, 203*b* or system, which instead are limited by the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a network node for transmitting enhanced Multimedia Broadcast Multicast Services, eMBMS, control information to wireless devices in a wireless telecommunications network, which eMBMS control information comprises MBMS Single Frequency Network, MBSFN, area configuration information and Multicast CHannel MCH Scheduling Information, MSI, for a Multicast CHannel, MCH, wherein the MBSFN area configuration information and the MSI indicate Multicast Traffic Channels, MTCHs, for the eMBMS, characterized in that the method comprises:
   configuring an indication of the MTCHs in the MBSFN area configuration information and in the MSI based on an order of logical channel identities of the MTCHs that is set in the network node; and
   transmitting the MBSFN area configuration information and MSI to the wireless devices in the wireless telecommunications network.

2. The method according to claim 1, wherein the indication of the MTCHs in the MBSFN area configuration information and the indication of the MTCHs in the MSI are configured according to the order of the logical channel identities of the MTCHs that is set in the network node.

3. The method according to claim 1, wherein the indication of the MTCHs in the MBSFN area configuration information are configured according to the order of the logical channel identities of the MTCHs that is set in the network node, and wherein the indication of the MTCHs in the MSI are configured according to the order of the MTCHs in the MBSFN area configuration information.

4. The method according to claim 1, wherein the order of the logical channel identities of the MTCHs that is set in the network node is in an increasing order of logical channel identities or in a decreasing order of logical channels.

5. The method according to claim 1, wherein the MBSFN area configuration information is transmitted on a Multicast Control CHannel, MCCH, in a Media Access Control, MAC, Protocol Data Unit, PDU, based on a MCCH repetition period.

6. The method according to claim 1, wherein the MSI is transmitted in a Media Access Control, MAC, Protocol Data Unit, PDU, at the beginning of each MCH Scheduling Period, MSP.

7. A network node for transmitting enhanced Multimedia Broadcast Multicast Services, eMBMS, control information to wireless devices in a wireless telecommunications network, which eMBMS control information comprises an MBMS Single Frequency Network, MBSFN, area configuration information and Multicast CHannel Scheduling Information, MSI, for a Multicast CHannel, MCH, wherein the MBSFN area configuration information and the MSI indicate Multicast Traffic Channels, MTCHs, for the eMBMS, characterized in that the network node comprises:

processing circuitry configured to configure an indication of the MTCHs in the MBSFN area configuration information and in the MSI based on an order of logical channel identities of the MTCHs that is set in the network node, and to transmit the MBSFN area configuration information and MSI to the wireless devices in the wireless telecommunications network.

8. The network node according to claim 7, wherein the processing circuitry is configured to configure the indication of the MTCHs in the MBSFN area configuration information and the indication of the MTCHs in the MSI according to the order of the logical channel identities of the MTCHs that is set in the network node.

9. The network node according to claim 7, wherein the processing circuitry is configured to configure the indication of the MTCHs in the MBSFN area configuration information according to the order of the logical channel identities of the MTCHs that is set in the network node, and to configure the indication of the MTCHs in the MSI according to the indication of the MTCHs in the MBSFN area configuration information.

10. The network node according to claim 7, wherein the order of logical channel identities that is set in the network node is in an increasing order of logical channel identities or in a decreasing order of logical channels.

11. The network node according to claim 7, wherein the processing circuitry is configured to transmit the MBSFN area configuration information on a MCCH in a Media Access Control, MAC, Protocol Data Unit, PDU, based on a MCCH repetition period.

12. The method according to claim 7, wherein the processing circuitry is configured to transmit the MSI in a Media Access Control, MAC, Protocol Data Unit, PDU, at the beginning of each MCH Scheduling Period (MSP).

13. A system in a wireless telecommunications network comprising:

at least a first and a second network node for transmitting enhanced Multimedia Broadcast Multicast Services, eMBMS, control information to wireless devices in the wireless telecommunications network, and which eMBMS control information comprises MBMS Single Frequency Network, MBSFN, area configuration information and Multicast CHannel Scheduling Information, MSI, for a Multicast CHannel, MCH, wherein the MBSFN area configuration information and the MSI indicate Multicast Traffic Channels, MTCHs, for the eMBMS, characterized in that the at least first and second network node each comprises processing circuitry configured to configure an indication of the MTCHs in the MBSFN area configuration information and in the MSI based on an order of logical channel identities of the MTCHs that is set in each of the first and second network node, respectively, wherein the order of logical channel identities of the MTCHs set in the at least first and second network node is the same.

\* \* \* \* \*